United States Patent [19]

Endo

[11] Patent Number: 4,947,204
[45] Date of Patent: Aug. 7, 1990

[54] PHOTOGRAPHIC PRINTER

[75] Inventor: Azuchi Endo, Kanagawa, Japan

[73] Assignee: Fuji Photo Film Co., Ltd., Kanagawa, Japan

[21] Appl. No.: 417,166

[22] Filed: Oct. 4, 1989

[30] Foreign Application Priority Data

Oct. 4, 1988 [JP] Japan ................................ 63-250710

[51] Int. Cl.$^5$ ........................ G03B 27/72; G03B 27/80
[52] U.S. Cl. ...................................... 355/20; 355/81; 355/67
[58] Field of Search ............................ 355/20, 81, 67

[56] References Cited

U.S. PATENT DOCUMENTS 3,256,388  6/1966  Miller ..................................... 355/20
4,742,375  5/1988  Kogane et al. ......................... 355/20

FOREIGN PATENT DOCUMENTS 101836  5/1988  Japan ..................................... 355/20

Primary Examiner—Monroe H. Hayes
Attorney, Agent, or Firm—Sughrue, Mion, Zinn, Macpeak & Seas

[57] ABSTRACT

A photographic printer having a video image printing system for making prints of video images displayed on a CRT, and a photographic image printing system using the CRT as an illumination light source for a film from which a photographic image is printed, including a control circuit for defocusing an electron beam by which a fluorescent screen of the CRT is stimulated to emit illumination light without rasters when the CRT is used in the film image printing system. The control circuit can either change an angle of deflection of the electron beam or stop deflection of the electron beam.

3 Claims, 4 Drawing Sheets

PHOTOGRAPHIC PRINTER

BACKGROUND OF THE INVENTION

The present invention relates to a photographic printer, and more particularly to a photographic printer which can make prints not only from a film but also from a video image display.

Photographic printers for selectively printing a video image displayed on a CRT screen and a photographic image recorded on a photographic film on a photographic paper are known. Such a photographic printer is provided with a lamp unit for displaying a video image thereon. The video image is directed and projected onto the photographic paper by a reflective mirror removably placed in a video image printing path. Because the CRT unit and the lamp unit are separately provided and placed interchangeably in the printing path by means of the reflective mirror, this type of photographic printer unavoidably becomes complicated in structure and large in size.

In an attempt at avoiding a large, complicated structure in a photographic printer, it was thought that a CRT should be used not only to display a video image but also to illuminate a negative film, as a light source. However, because luminance of general CRTs is considerably lower than that of halogen lamps, prolonged exposure time is needed to make a print from a negative film, so that it is difficult to use the printer with a high efficiency. Furthermore, because of flickering of images displayed on the CRT because of raster scanning, it is unsatisfactory to use the CRT as a light source for illuminating a negative film.

SUMMARY OF THE INVENTION

Therefore, it is an object of the present invention to provide a video image/film image printer, with a CRT, which has a reduced size and simple structure.

It is another object of the invention to provide a video image/film image printer with a CRT in which an exposure of a photographic image can be effected in a short exposure time.

To achieve the above and other objects, the invention provides a photographic printer comprising a video image printing system for making prints of video images displayed on a CRT, and a photographic image printing system using the CRT as an illuminating source for making prints from a film, these systems being used selectively. The CRT incorporates a controller for defocusing an electron beam and either changing an angle of deflection of the electron beam or inhibiting deflection of the electron beam so as to cause a light emitting area of the CRT to have a size corresponding to a frame size of the film when the photographic image printing system is used.

According to one feature of the invention, when using the printer as a video image printing system, the CRT is connected to and controlled by a video control circuit and a deflection control circuit so as to display a video image to be printed. On the other hand, when using the printer as a film image printing system, the CRT is connected not to a video control circuit and a dynamic focusing circuit, but to potential regulator circuits, so as to defocus an electron beam. Accordingly, the CRT fluorescent screen emits light that is used to illuminate a film so as to project a film image onto a photographic paper. Because of the defocused electron beam, the CRT fluorescent screen provides light without being adversely effected by raster scanning, and hence without flicker. Accordingly, the CRT can be used as an illumination source for making prints from a film.

Furthermore, because an angle of deflection of the electron beam is changed in accordance with a frame size of the film, an exposure can be made while very effectively using illumination light emanating from the CRT. When stopping the change of deflection of the electron beam, a center area of the CRT fluorescent screen can emit light without being adversely effected by raster scanning, so that an exposure for a film image can be performed in a relatively short time.

DETAILED DESCRIPTION OF THE PREFERRED EMBODIMENT

Figure 1:
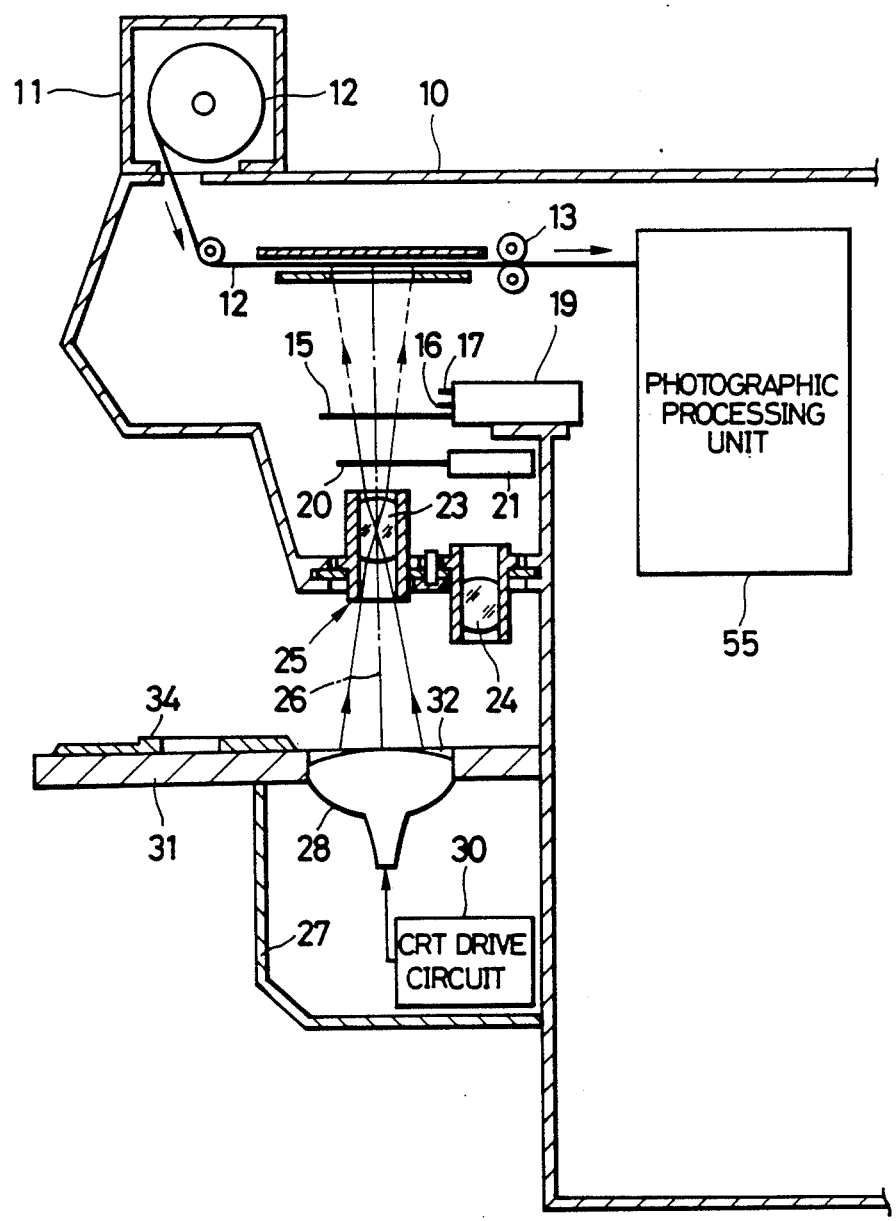
FIG. 1 is a schematic cross-sectional view of a photographic printer according to a preferred embodiment of the present invention which is used as a video image printing system.
Figure 2:
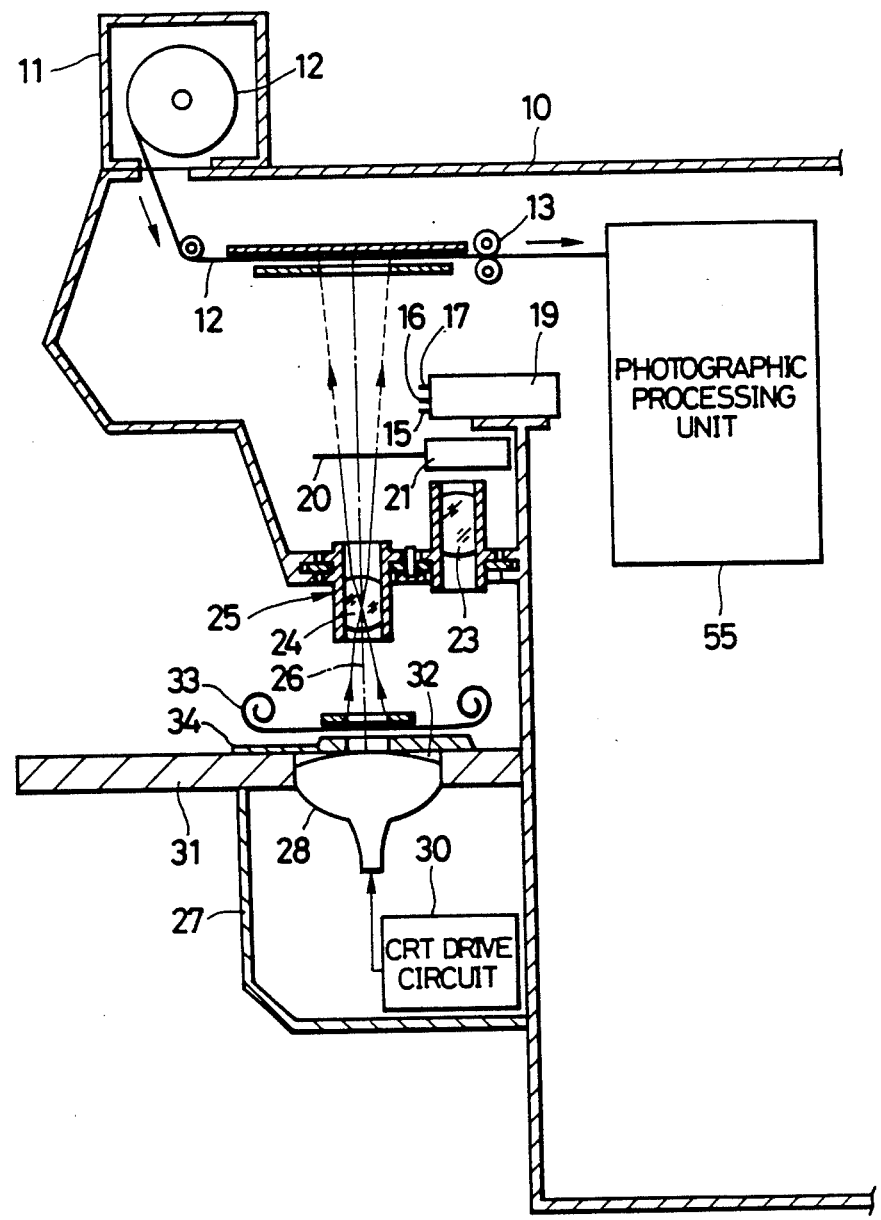
FIG. 2 is a schematic cross-sectional view of the photographic printer of FIG. 1 which is used as a film image printing system.

Referring now to the drawings in detail, and in particular to FIGS. 1 and 2, there is shown a photographic printer for selectively printing a video image and a film image. As shown in FIG. 1, the photographic printer has a housing 10 has a magazine 11, detachably mounted on the top of the housing 10 and containing a photographic material such as a color paper 12 rolled therein. The color paper 12 is withdrawn intermittently from the magazine 11 by a pair of feed rollers 13 and forwarded into an exposure chamber 5. There, the color paper 12 is held flat between a framing mask 6 and a pressure plate 7.

Below the framing mask 6 in the exposure chamber 5, there are disposed three color filters 15–17, namely red, green and blue filters, controlled by a filter controller 19. A shutter 20 is controlled by a shutter controller 21. A turret disk 25 has a video image printing lens 23 mounted thereon, for projecting a reduced size of video image displayed on the CRT onto the color paper 12 a film image printing lens 24 for projecting an increased size of a film image of a negative film. It is apparent that a zoom lens may be used in place of these two printing lenses 23 and 24.

The housing 10 of the photographic printer is provided with a CRT chamber 27 under the exposure chamber 5. The CRT chamber 27 accommodates therein a black-and-white CRT 28 with a phosphor or display screen horizontally placed parallel to the color paper 12 held between the framing mask 6 and the pressure plate 7. This black-and-white CRT 28 is driven by a CRT drive circuit 30 which will be described in detail in association with FIG. 3.

The housing 10 of the photographic printer further is provided with a working table 31 with an opening 32 in which the upper frame of the black-and-white CRT 28 is received. The light emanating from the black-andwhite CRT 28 travels towards the printing lens 23 or 24 placed on the printing path 26 by the turret disk 25. In this embodiment, a black-and-white CRT having a high resolution power preferably is used for the black-and-white CRT 28 in order to provide a high print image quality.

A film holder 34 is placed on the working table 31. On photographic image printing, the film holder 34 is shifted and placed over the opening 32 of the working table 31 to place thereon an image frame of a color negative film 33 in position. The color negative film 33 is pressed down by a framing mask 8 (shown in FIG. 2), the pressing being caused by a solenoid (not shown) upon printing.

Figure 3:
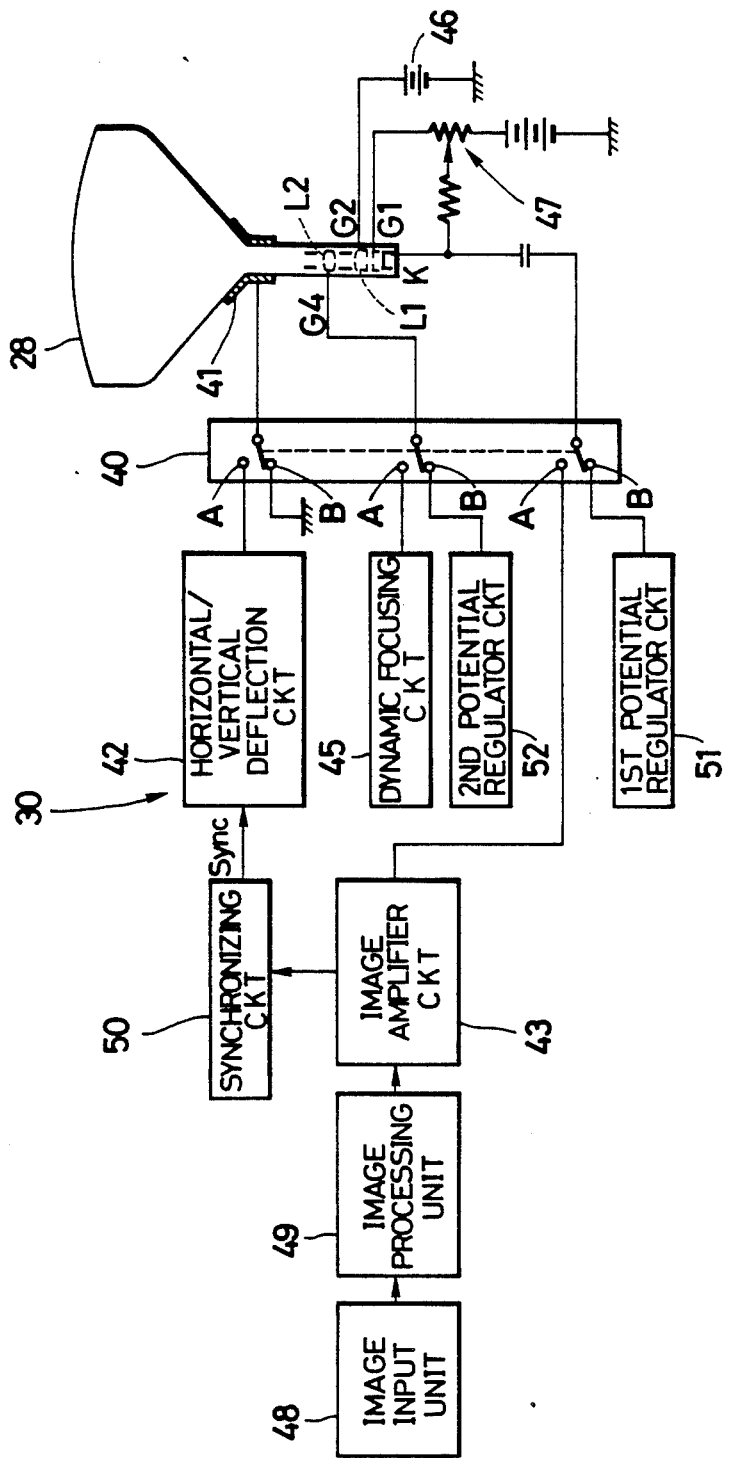
FIG. 3 is a block diagram showing a CRT and a control circuit for the CRT.

As is shown in FIG. 3, the CRT drive circuit 30 includes a selector 40 for changing the black-and-white CRT 28 between an image display mode and an illumination mode. When selecting the image display mode, a deflection yoke coil 41 of the black-and-white CRT 28 is connected to a vertical/horizontal deflection circuit 42, and a cathode K of the black-and-white CRT 28 is connected to an image amplifying circuit 43. A fourth grid G4 constituting a main converging lens L2 is connected to a dynamic focusing circuit for converging an electron beam.

A cathode grid lens L1 comprising the cathode K and first and second grids G1 and G2 directs thermion emission from the cathode K in every direction as a thin electron beam, thereby effecting a preparatory convergence of the electron beam and, at the same time, modulates and controls the electron beam in accordance with the potential difference between electrodes. For this purpose, the black-and-white CRT 28 is connected with a voltage regulator circuit 46 for supplying a constant voltage to the black-and-white CRT 28. The first grid G1 is connected with a brightness regulator circuit 47 for changing voltage applied to the black-and-white CRT 28, thereby varying the brightness of the black-and-white CRT 28.

Figure 4:
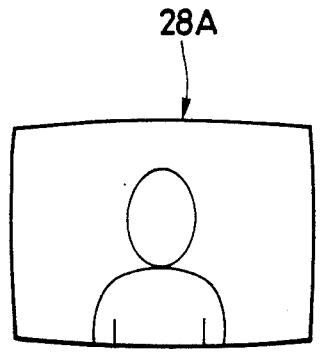
FIGS. 4 and 5 are illustrations of a screen of the CRT when the photographic printer is used as a video image printing system and a film image printing system, respectively.

Three color video signals input by means of an image input section 48 consisting of a TV camera or a video player are processed by color by means of an image processing circuit 49 and thereafter are sent to the image amplification circuit 43. The image amplifier circuit 43 amplifies the video signals, in particular brightness signals, to a necessary level as input signals to the black-and-white CRT 28 and delivers signals to a synchronizing circuit 50. The synchronizing circuit 50 generates horizontal and vertical synchronizing signals, based on the signals delivered from the image amplifier circuit 43, to the horizontal/vertical deflection circuit 42. The horizontal/vertical deflection circuit 42 provides horizontal and vertical deflection signals for deflecting the electron beam. In this manner, a video image is displayed on a screen 28A of the black-and-white CRT 28 as shown, for example, in FIG. 4. Three monocolor video images are displayed in order. During the display of a monocolor video image, a color filter corresponding to the color of the video image displayed is inserted into the printing path. In such a manner, three color frame sequential exposure is effected. The image processing circuit 49 performs gamma correction, gradation correction and positive-to-negative conversion, and further density and color correction by color if necessary.

When selecting the illumination mode, the selector 40 selects the connection of the deflection yoke coil 41 of the black-and-white CRT 28 to the ground rather than the vertical/horizontal deflection circuit 42, the connection of the cathode K of the black-and-white CRT 28 to the first potential regulator circuit 51 rather than image amplifying circuit 43, and the connection of the fourth grid G4 to the second potential regulator circuit 52 rather than the dynamic focusing circuit 45. The first potential regulator circuit 51 applies a constant voltage to the cathode K to the black-and-white CRT 28 so that the black-and-white CRT 28 provides a constant brightness of illumination. The second potential regulator 52 adjusts the focal length of the main converging lens L2 so as to form an illumination light beam having a diameter sufficient to cover a frame of the negative film 33 from the black-and-white CRT 28.

A photographic processing unit 55 disposed in the housing 10, which is well known in the art, is provided with a cutter for cutting the exposed color paper 12 to strips, various processing tanks, such as a developing tank, a bleaching and fixing tank, a washing tank, a drying drum, and a cutter for cutting the processed color paper 12 into prints, all of which are well known in the art and need not be illustrated and described here.

In operation of the photographic printer in the video image printing mode as shown in FIG. 2, as a result of an operation of the keyboard, the turret disk 25 is turned to place the video image printing lens 23 into the printing path 26, and the selector 40 changes the CRT drive circuit 30 to the video image display mode. When inputting a printing signal through the keyboard, the CRT drive circuit 30, the filter controller 19 and the shutter 21 are actuated so as to perform a three color frame sequential exposure. For the three color frame sequential exposure, a video image for red is displayed as a black-and-white image in a brightness pattern on the screen 28A of the black-and-white CRT 28. Simultaneously, the red filter 15 is inserted in the printing path 26 so as to change the black-and-white image into a red video image. As a result, the color paper 12 is exposed to the red video image to create a latent image therein. In the same manner, latent images of green and blue video images are formed over the latent images of the red video image in the color paper 12.

After the exposure of a video image in the additive three color frame sequential exposure method, the color paper 12 is forwarded by one frame so as to place an unexposed part thereof at the exposure position for another exposure.

For making a print from a negative film 33, the film holder 34 is placed on the working table 31 and the negative film 33 is placed on the film holder 34. Thereafter, the keyboard is operated to select the illumination mode and to turn the lens holder 25, thereby placing the film image printing lens 24 in the printing path 26. Simultaneously, the selector 40 changes the CRT drive circuit 30 to connect the deflection yoke coil 41 to ground, the cathode K to the first potential regulator circuit 51 and the fourth grid G4 to the second potential regulator circuit 52.

Figure 5:
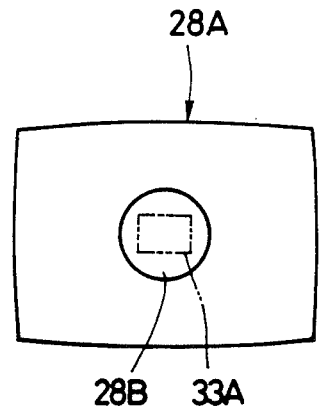

Then, by inputting a printing signal through the keyboard, the CRT drive circuit 30, the filter controller 19 and the shutter 21 are actuated for performing an additive exposure by the use of the black-and-white CRT 28 as an illumination light source. That is, upon inputting the print signal, the first and second potential regulator circuits 51 and 52 of the CRT drive circuit 30 apply predetermined constant voltages to the cathode K and the fourth grid G4 of the black-and-white CRT 28, respectively. Consequently, a certain quantity of electrons, which are not focused, impinge against the fluorescent surface of the screen 28A of the black-and-white CRT 28. Because the deflection yoke coil 41 is not activated, the screen 28A of the black-and-white CRT 28 emits light in a circle at the center as shown in FIG. 5.

As described previously, the light emitting area 28B of the screen 28A of the black-and-white CRT 2 is sufficiently large to cover a frame 33A of the negative film 33. The light emitting area 28B can be changed in size by changing a voltage applied by the second potential regulator circuit 52.

The light from the light emitting area 28B of the screen 28A of the black-and-white CRT 2 illuminates the negative film 33 placed on the film holder 34. In the same manner as described previously for video image printing, the three color filters 15-17 are controlled and are inserted independently into the printing path 26, thereby to perform a three color frame sequence exposure. After exposure, the color paper 12 is forwarded to the photographic processing unit 55 for development.

It is to be noted that whereas the deflection yoke coil 41 is changed in connection to ground from the horizontal/vertical deflection circuit 42 so as to prohibit deflection of the electron beam, nevertheless, it may be permissible to defocus an electron beam. In this case, the deflection yoke coil 41 is kept connected to the horizontal/vertical deflection circuit 42 so as to deflect horizontally and vertically the defocused electron beam. This results in forming the screen 28A of the black-and-white CRT 28 as an illuminating surface without rasters, thereby improving the quality of printing light in the film image printing mode. By changing the size of horizontal and vertical deflection in accordance with the size of negative film, the black-and-white CRT 28 is operated with a high efficiency of light emission.

Although the present invention has been fully described by way of preferred embodiments thereof with reference to the accompanying drawings, various changes and modifications will be apparent to those of working skill in this technical field. Therefore, unless otherwise such changes and modifications depart from the scope of the present invention, they should be construed as included therein.

What is claimed is:

1. A photographic printer comprising:
   a CRT having a fluorescent screen;
   a video image printing system for making a print of a video image displayed on said fluorescent screen of said CRT;
   means for selectively displaying one of a video image and a light beam from said CRT;
   a film image printing system using said CRT as a light source for making a print from a film; and
   defocusing means for defocusing an electron beam by which said fluorescent screen of said CRT is stimulated to emit illumination light without rasters when said CRT is used in said film image printing system.

2. A photographic printer comprising:
   a CRT having a fluorescent screen;
   a video image printing system for making a print of a video image displayed on said fluorescent screen of said CRT;
   means for selectively displaying one of a video image and a light beam from said CRT;
   a film image printing system using said CRT as a light source for making a print from a film; and
   means for defocusing an electron beam and changing an angle of deflection of said defocused electron beam so as to stimulate an area of said fluorescent screen of said CRT having a size in accordance with a size of frame of said film, causing 15 said fluorescent screen to emit illumination light without rasters, when said CRT is used in said film image printing system.

3. A photographic printer comprising:
   a CRT having a fluorescent screen;
   a video image printing system for making a print of a video image displayed on said fluorescent screen of said CRT;
   means for selectively displaying one of a video image and a light beam from said CRT;
   a film image printing system using said CRT as a light source for making a print from a film; and
   means for defocusing an electron beam of said CRT by stopping deflection of said defocused electron beam so as to stimulate an area of said fluorescent screen of said CRT having a size in accordance with a size of frame of said film, causing said fluorescent screen to emit light without rasters, when said CRT is used in said film image printing system.

* * * * *